INVENTOR.
JULES LEHMANN
BY
ATTORNEY

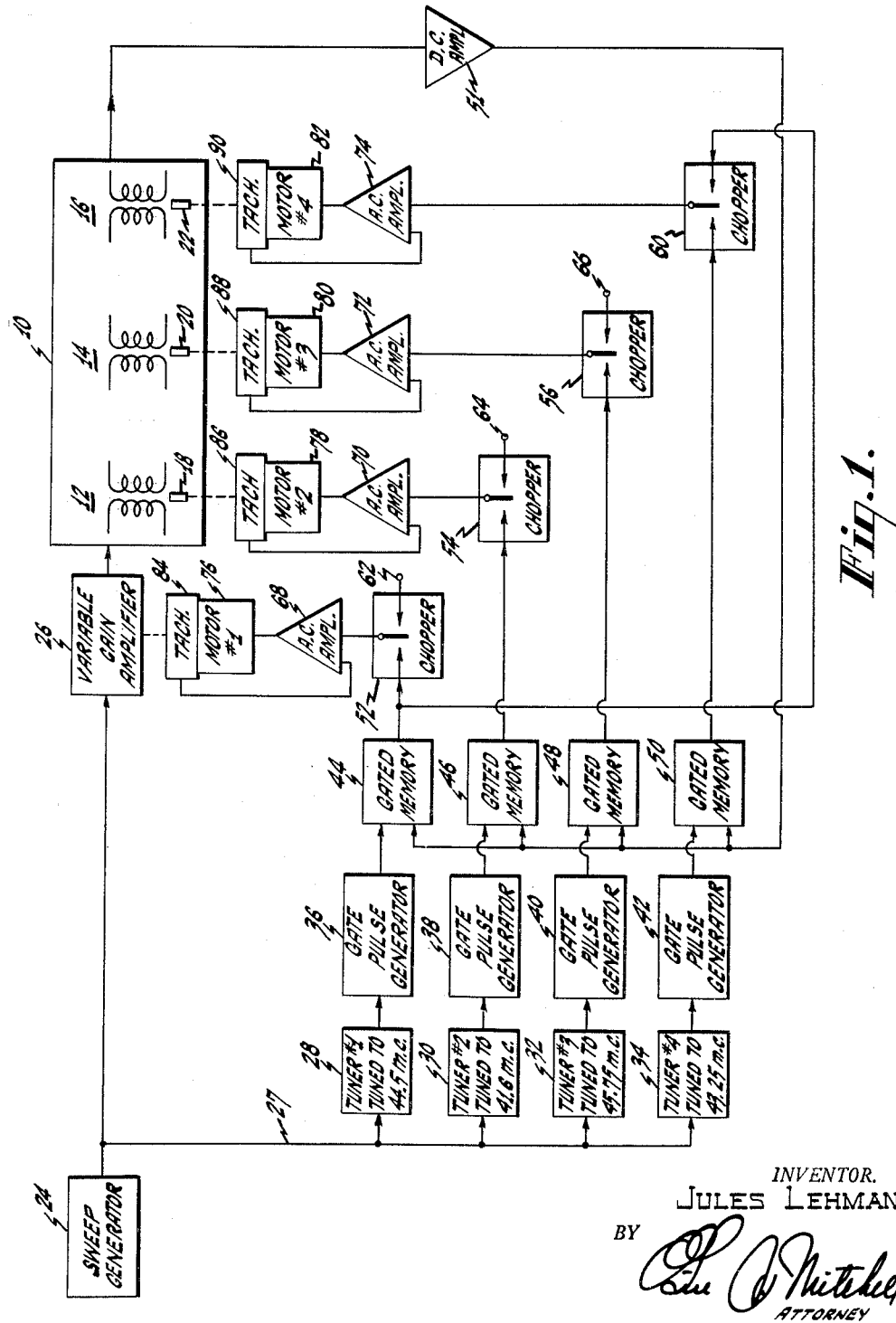
April 4, 1961     J. LEHMANN     2,978,647
AUTOMATIC ALIGNMENT SYSTEM
Filed Sept. 9, 1957     5 Sheets-Sheet 1
INVENTOR.
JULES LEHMANN

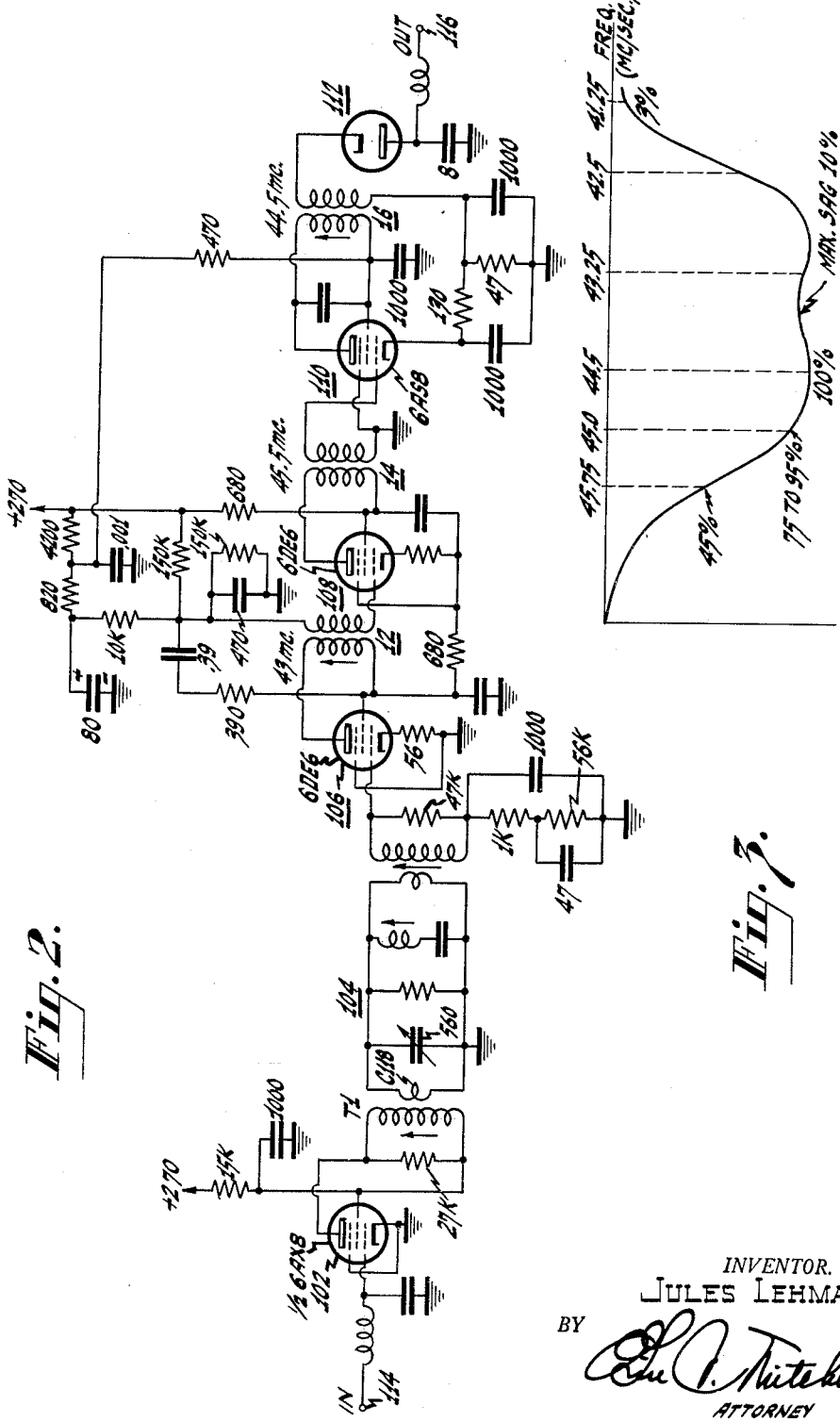

April 4, 1961

J. LEHMANN 2,978,647

AUTOMATIC ALIGNMENT SYSTEM

Filed Sept. 9, 1957

INVENTOR.
JULES LEHMANN
BY
*[signature]*
ATTORNEY

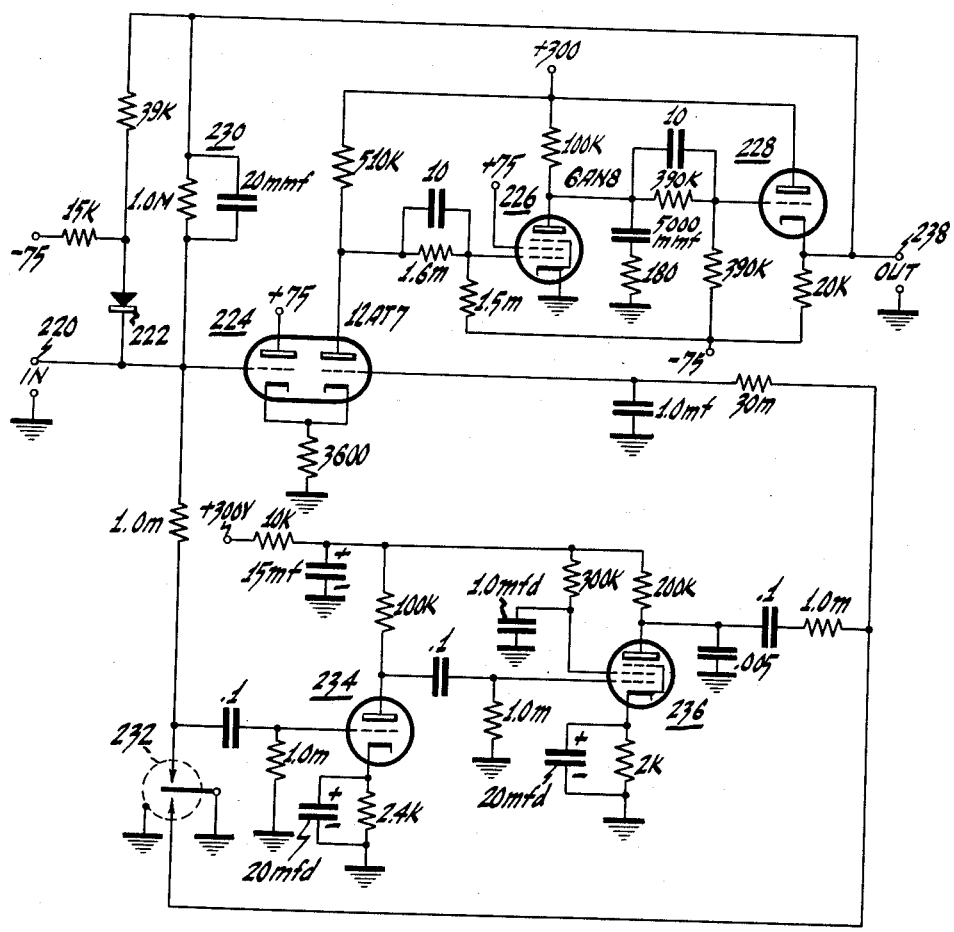
Fig. 9.
INVENTOR.
JULES LEHMANN
BY
ATTORNEY

United States Patent Office 2,978,647
Patented Apr. 4, 1961

2,978,647

AUTOMATIC ALIGNMENT SYSTEM

Jules Lehmann, Trenton, N.J., assignor to Radio Corporation of America, a corporation of Delaware Filed Sept. 9, 1957, Ser. No. 682,789

9 Claims. (Cl. 330—2)

The present invention relates to an alignment system for automatically aligning electric circuits, and more particularly to an improved system which accurately and quickly tunes resonant circuits to a predetermined frequency response characteristic.

In many instances, it is necessary to align an electrical circuit to a predetermined frequency. For example, radio and television receivers which are now being produced in great volume include a number of resonant circuits which must be tuned to the correct operating frequencies. Generally, the alignment of such resonant circuits has been preformed manually by trained operators. Each operator views the response of each resonant circuit on an oscilloscope, or on an indicating meter, and manually tunes the resonant circuit to the correct frequency as indicated by a maximum or peak response of the resonant circuit. Such an alignment procedure is inherently laborious and time consuming and requires skilled personnel to manipulate the test equipment and interpret the data obtained. While a human operator can align a single resonant circuit with good accuracy and in a relatively short period of time, when he attempts to align resonant circuits one after the other, he is unable to operate with any acceptable speed or accuracy over long periods of time. Consequently, when tunable circuits are aligned manually, the results are non-uniform.

Automatic alignment apparatus has been provided for tuning a single resonant circuit to a predetermined resonant frequency. However, the procedures used are not satisfactory for applications such as multi-stage stagger-tuned or overcoupled amplifiers, wherein interstage coupling transformers are tuned to provide an overall predetermined frequency response characteristic for the amplifier. This is particularly true of television receiver picture I.F. amplifiers wherein the frequency response characteristic must be accurately controlled to obtain optimum transient responses and to prevent undesired interaction between the sound and picture signals.

It is, therefore, desirable to have a fully automatic alignment system wherein the resonant circuits can be accurately, reliably, and uniformly aligned to provide the correct frequency response characteristic. Also, it is desirable to decrease the time required to tune each circuit to the correct frequency response characteristic without employing highly skilled technicians, so that more receivers can be tuned in a given period of time and the expense of operating personnel can be reduced.

It is accordingly an object of this invention to provide a new and improved apparatus for automatically aligning electric circuits to predetermined frequencies.

It is another object of the present invention to provide an improved automatic alignment system for tuning cascaded resonant circuits in a manner to provide a desired frequency response characteristic which is suitable for unskilled operators on a production line basis.

A further object of this invention is to provide an improved automatic alignment system wherein a plurality of cascade resonant circuits may be aligned to a desired frequency response characteristic without requiring individual connections to each of the resonant circuits.

It is a still further object of this invention to provide an improved automatic alignment apparatus for aligning electric circuits such as stagger-tuned or overcoupled amplifiers to a predetermined frequency response characteristic wherein such alignment may be accomplished by unskilled operators in a minimum amount of time on a production line basis and with a high degree of uniformity of the aligned circuits.

In the automatic alignment apparatus of the invention the frequency response of apparatus including a plurality of tunable circuits to be aligned is sequentially sampled at different selected signal frequencies of substantially constant amplitude. The response of the apparatus at each of the selected signal frequencies is compared with standard or reference signals representative of the desired output level of the apparatus at the particular frequency sampled. Any difference between the measured level and that of the standard is used to control a servo system connected to automatically adjust the tuning elements of the resonant circuits. In this manner a stagger-tuned amplifier such as used in radio or television receivers can be quickly and accurately adjusted to a predetermined frequency response characteristic.

The desired overall frequency response of an amplifier may be specified in relative values, that is, at any frequency in the amplifier passband the response is specified as a percentage of the maximum response over the passband. The response at each of a finite number of signal frequencies is translated into fixed reference potentials having relative amplitudes corresponding to the response of the amplifier at each of the finite number of signal frequencies. A problem is encountered in that the gain of an amplifier being aligned varies considerably during the aligning procedure. This variation in gain may produce instability of the alignment system in that the relative magnitudes of the error signals produced are initially quite large, and of the same sense since the output level from an unaligned amplifier is ordinarily uniformly less across the amplifier passband than the desired output level.

A further object of this invention is to provide an automatic alignment system for accurately aligning stagger-tuned amplifier circuits to a predetermined frequency response characteristic which is unaffected by variations in gain of such amplifier circuits during the aligning procedure.

In accordance with the invention the alignment apparatus is provided with a signal channel including an amplifier to be aligned. The gain of this signal channel is automatically controlled to maintain a fixed output amplitude at some frequency within the amplifier passband. The reference signals which are representative of the desired output of the amplifier at the different sampling frequencies are all related to the fixed output amplitude in accordance with the desired response curve to be attained. Since the signal channel output is fixed at some frequency within the passband, the resulting error signals which control the tuning of the amplifier resonant circuits are always related to the amount of misalignment from the desired frequency response curve. Thus the alignment system operates toward producing the desired relative response throughout the entire procedure.

Further in accordance with the invention the gain of the signal channel is automatically controlled by sampling the response of the amplifier at a predetermined frequency. The output signal from the amplifier is compared with a reference signal representative of the desired output level of the amplifier at the sampling frequency. An error signal resulting from this comparison is used to control a servo loop for automatically adjusting the gain in the system to reduce the error. In this manner the resulting frequency response curve of an amplifier may be accurately and quickly adjusted to conform to a predetermined standard which is unaffected by variations in gain of the amplifier during the alignment procedure.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a schematic circuit diagram in block form of an automatic alignment system in accordance with the invention;

Figure 2 is a schematic circuit diagram of a stagger-tuned intermediate frequency amplifier for television receivers which may be automatically aligned with the system of the present invention;

Figure 3 is a graph of a desired frequency vs. amplitude characteristic for the intermediate frequency amplifier shown in Figure 2;

Figures 4, 5, 6, 7, 8 and 9 are detailed schematic circuit diagrams of portions of the automatic alignment system of Figure 1.

Figure 4:
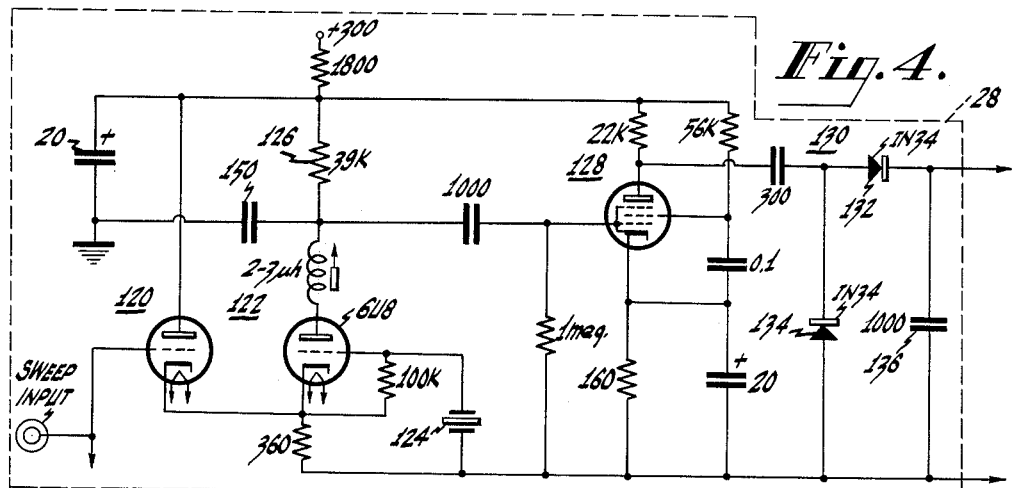

Referring now to the drawings and more particularly to Figure 1 thereof, there is illustrated in block diagram form one alignment system embodying the present invention which is capable of accurately aligning cascaded resonant circuits to provide a predetermined frequency response characteristic on a fully automatic basis.

Before considering the details of the system, it is pointed out generally that corresponding reference characters have been used throughout the drawings to identify corresponding circuit elements of the system. It is also pointed out that while single conductors have been illustrated as interconnecting the units shown in block diagram form in Figure 1, all the units are connected to common ground potential indicated in each of the detailed schematic circuit diagrams.

The automatic alignment system is shown in connection with a modulated carrier wave receiver, such as a television receiver, indicated generally at 10, having a tuned amplifier circuit such as a stagger-tuned intermediate frequency amplifier which is to be aligned to provide a predetermined frequency response characteristic. The I.F. amplifier of the receiver 10 is indicated as having at least three interstage coupling transformers 12, 14 and 16 which are individually tunable to a desired frequency of resonance by the movable tuning slugs 18, 20 and 22.

The alignment of the receiver 10 is controlled by sequentially sampling and comparing the response of the receiver at each of a finite number of signal frequencies with that of fixed reference potentials representative of the desired output level of the receiver at each of the signal frequencies compared. It has been ascertained that the interaction of the effects of tuning the transformers 12, 14 and 16 in the stagger-tuned intermediate frequency amplifier is such that each may be tuned to control different portions of the frequency response characteristic of the amplifier. Accordingly, by adjustment of the tuning slug 18 of the transformer 12, the frequency response at the low frequency end of the passband can be predominately controlled. Likewise by adjustment of the tuning slug 20 of the transformer 14 the high frequency end of the passband can be controlled and the tuning slug 22 of the transformer 16 can be used to control the tilt of the resulting frequency response characteristic.

To align the receiver 10, a sweep frequency generator 24, operable to provide a signal cyclically varying in frequency over the band of frequencies to be passed by the I.F. amplifier under alignment, is connected to the receiver 10 through a variable gain amplifier 26. The sweep frequency signal from the generator 24 is also applied through a conductor 27 to four tuners 28, 30, 32 and 34 each of which is responsive to a different frequency in the frequency band covered by the sweep frequency generator 24. The sweep frequency generator 24 may be set to deliver a sweep frequency cyclically varying in frequency over the passband of the amplifier to be aligned which in the case of I.F. amplifiers for present day television receivers is between 40 and 48 megacycles. The cyclic rate of the generator 24 may be 60 cycles per second which is standard for many available sweep generators.

Four servo loops are provided for controlling the alignment of the receiver 10. One servo loop adjusts the gain of the variable gain amplifier 26 and the other three servo loops are for controlling the tuning of the transformers 12, 14 and 16. The servo loops are controlled in accordance with the response of the receiver 10 to different signal frequencies from the generator 24. The sampling frequencies are determined by crystal tuners 28, 30, 32 and 34, one in each of the four servo loops. The tuner 28 which is in the servo loop for controlling the gain of the variable gain amplifier 26 is tuned to 44.5 megacycles. Thus when the signal from the sweep frequency generator 24 passes through 44.5 megacycles, an output pulse is produced by the tuner 28. This pulse is used to condition the servo loop to be responsive to the output signal from the receiver 10 at 44.5 megacycles. The output signal from the receiver 10 at this frequency is compared with a standard reference signal applied to a terminal 62 and which corresponds to the desired output signal of the receiver at 44.5 megacycles. If there is any difference between the output signal and the standard signal, an error signal is produced which controls the servo loop to adjust the input signal amplitude to the receiver in a manner to maintain the output signal constant.

The tuners 30, 32 and 34 which are in servo loops for controlling the tuning of the transformers 12, 14 and 16 respectively, are tuned to 41.6 megacycles, 45.75 megacycles and 43.25 megacycles respectively. These tuners condition their servo loops to sample the receiver 10 output at the signal frequencies indicated for comparison with predetermined reference signals to derive an error voltage which is used to control the tuning of the transformers 12, 14 and 16. The selection of sampling frequencies is not critical, and other frequencies could be used without departing from the scope of the invention.

In addition to the tuners, each of the servo loops include a gate pulse generator 36, 38, 40 and 42 connected to a gated memory circuit 44, 46, 48 and 50. The output signal from the receiver 10 is applied to each of the memory circuits through a D.C. amplifier 51. The memory circuits do not accept information supplied by the receiver 10 except when triggered by the gate pulse generator connected therewith. The respective memory circuits are triggered in response to different signal frequencies applied to the receiver 10 to store signals representative of the receiver output at these different frequencies.

Each of the servo loops is also provided with a chopping circuit 52, 54, 56 and 60. The chopping circuits or choppers include a pair of stationary contact terminals, and a vibratory armature element. One of the stationary contact terminals of the chopping circuits 52, 54 and 56 is connected to the gated memory circuits 44, 46 and 48 respectively, and the other terminal is connected to a fixed reference potential terminal 62, 64 and 66. The amplitude of the reference potential which is preferably a D.C. potential applied to the terminals 62, 64 and 66 corresponds to the desired relative output level of the receiver 10 at 44.5, 41.6 and 45.75 megacycles respectively. It can be noted that the second stationary contact terminal of the chopper 60 is connected to the gated memory 44. The purpose of the chopping circuits is to compare the signal applied to the two stationary contact terminals to derive error signals which control the respective servo loops. To this end, the vibratory armature element alternately engages the stationary contact terminals to produce a square wave of an amplitude corresponding to the difference in output between the receivers 10 and the corresponding reference voltage, and of a frequency corresponding to the rate of vibration of the armature. This square wave is fed to a servo amplifier 68, 70, 72 and 74, one for each servo loop, for amplification to control the servo motors 76, 78, 80 and 82. Since the information from the memory circuits is continuously available to the chopping circuits, an error signal is available to provide continuous control of the motors until the receiver 10 is in proper alignment.

The tachometer generators 84, 86, 88 and 90 are coupled to the servo motors 76, 78, 80 and 82 respectively. The tachometer generator output signal is summed together with the amplified chopper signal. Thus the overall servo loop including the receiver 10 is a position servo while a velocity servo loop is obtained with the servo motor and amplifier. The amount of tachometer feedback used in each loop may be determined experimentally, and is adjusted to result in a fast and stable system.

It will be noted that the response of the receiver 10 at the various sampling frequencies is compared with fixed reference potentials. The gain of receivers and amplifiers varies considerably during the aligning procedure. The overall response is usuall specified in relative values, and it is necessary to maintain a fixed response at some frequency within the passband to be able to translate the relative measurements into fixed reference potentials. In accordance with the invention the desired output of the receiver 10 at 44.5 megacycles as represented by the reference potential applied to the terminal 62 is compared with the actual response of the receiver at 44.5 megacycles, and any difference produces an error signal which controls the gain of the amplifier 26. This in turn adjusts the signal amplitude applied to the receiver 10 in a direction so that the output signal amplitude approaches that of the potential applied to the terminal 62. In this manner the response of the receiver at other sampling frequencies can be adjusted to correspond to the other fixed reference potentials.

Ordinarily if the gain control servo loop controlled the gain of an amplifier being aligned, the changes in AGC voltage would also shift the response curve, hence it is usually desirable to control the gain of the system in a separate amplifier such as the amplifier 26. However, in certain applications wherein such effects are of a secondary nature, the gain control servo loop may control the gain of an amplifier being aligned.

Although the automatic alignment system of the invention has been described in connection with the I.F. amplifier of a television receiver, it should be understood that it is applicable generally to tuned amplifiers and passive tuned circuits.

In considering the detailed circuitry of the system components briefly described above, the operation of these components will be analyzed insofar as possible in terms of the functions which they perform in tuning the resonant circuits 12, 14 and 16 to provide substantially the same frequency response characteristic as established by the various reference potentials. Unless necessary to an understanding of the operation of a particular system component, those circuit elements which perform entirely conventional functions in the circuit, namely functions which will be readily understood by those skilled in the art, have not been identified in the drawings nor referred to in the following description of the system components.

Figure 2 schematically illustrates a portion of a television receiver including a conventional stagger-tuned amplifier circuit of the type which may be automatically aligned by means of the apparatus described above with reference to Figure 1. In addition to the intermediate frequency amplifier, the schematic of Figure 2 shows the usual mixer stage 102 incorporated in superheterodyne receivers for converting a selected signal modulated radio frequency carrier to a corresponding intermediate frequency signal. The I.F. signal developed in the mixer output circuit is conveyed through an overcoupled passive network 104 to a stagger-tuned I.F. amplifier including three amplifier stages 106, 108 and 110 with tunable interstage coupling transformers 12, 14 and 16. These transformers may be of any suitable type such as; wound on a suitable coil form and tuned by a centrally movable tuning slug; or printed on an insulating supporting panel and tuned by eddy current disks which may be moved toward or away from the respective windings. After amplification by the I.F. amplifier, the signal is detected in a rectifier circuit 112 connected to the secondary winding of the transformer 16, which comprises the video detector stage of the television receiver 10.

The signal from the sweep frequency generator 24 is applied through the variable gain amplifier 26 to the input terminal 114 which is coupled to the control grid of the mixer stage 102, and the amplified output signal from the I.F. amplifier is derived from a terminal 116 which is coupled to the anode of the video detector. An example of a desired overall frequency response curve for the stagger-tuned amplifier is shown in Figure 3 and represents a standard response for a television receiver with a 40 megacycle I.F. amplifier. In this curve the frequency of an applied signal of constant amplitude is indicated along the abscissa and relative amplitude of the signal appearing at the output terminal 116 is indicated on the ordinate. As shown on this curve the passband of the intermediate frequency amplifier of Figure 2 extends over a range of frequencies from about 40 to 48 megacycles. In aligning a stagger-tuned amplifier to provide this frequency response characteristic, it is necessary to formalize the effects of the transformers 12, 14 and 16. This was found to be possible by applying the following criterion: The transformer 12 affects mainly the low frequency portion of the response curve, and is tuned to adjust the response of the amplifier for a signal input frequency of 41.6 megacycles; the transformer 14 affects mainly the high frequency portion of the response curve and is tuned to adjust the response for a signal input frequency of about 45.6 megacycles; and the transformer 16 affects the tilt of the response curve between the low and high frequency ends of the passband and is adjusted in accordance with the difference in response of the amplifier for signal input frequencies of 44.5 and 43.25 megacycles.

As previously pointed out in the general description of the system in Figure 1, the tuners 28, 30, 32 and 34 are tuned to different frequencies so that only one servo loop at a time is conditioned to accept information from the receiver 10. Since the construction of the three tuners is similar only the tuner 28 has been illustrated.

Referring to Figure 4, the tuner 28 includes a cathode follower stage 120 the control grid circuit of which is connected to the sweep frequency generator 24. The cathode follower 120 which provides isolation from the other servo loops is cathode coupled to a self oscillating converter stage 122. The frequency of the oscillator portion of the converter stage 122 is controlled by a crystal 124 at 44.5 megacycles for the tuner 28. For the tuners 30, 32 and 34 the oscillator frequency should be 41.6, 45.75 and 43.25 megacycles respectively. Of the many resultant frequency components present in the plate current of the converter 122 the one portion of interest is the difference frequency containing the zero beat which will appear across the plate load resistor 126. This beat burst is amplified by a pentode amplifier 128 which may for example comprise the pentode section of a 6U8 type tube.

The instantaneous value of the output voltage at zero beat can be of varying positive or negative amplitude depending upon the relative phase of the two mixed signals. This provides an envelope whose desired positive half has an irregular peak amplitude. Accordingly, this signal is fed through a half wave doubler 130 including the rectifiers 132 and 134, so that each negative half cycle is added to each succeeding positive half cycle. The resulting transformed envelope is detected by an output capacitor 136, and is used to key the gate pulse generator 36.

Figure 5:
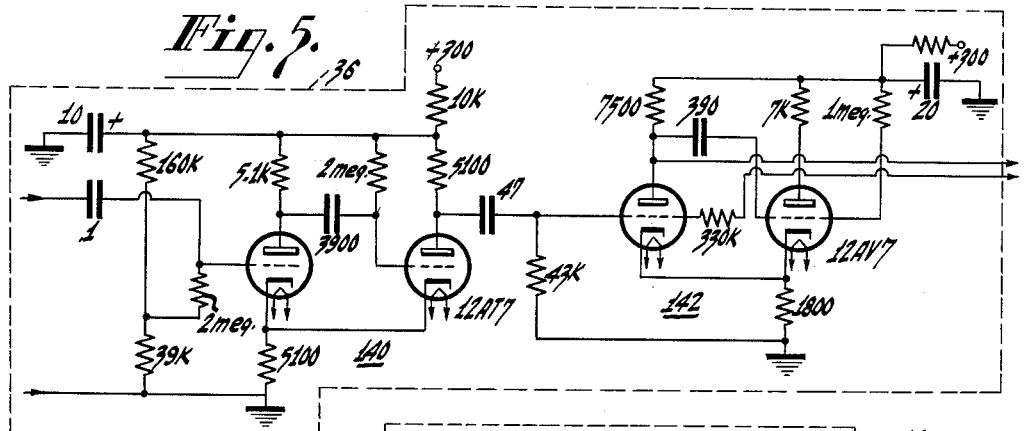

The gate pulse generator 36 as shown in Figure 5 comprises a cathode coupled univibrator 140. To avoid multiple triggering on an input pulse the delay of a univibrator is made appreciably longer than the trigger pulse from the tuner 28. The level at which the univibrator 140 may be triggered can be varied by altering the grid bias on the input stage thereof.

The output from the univibrator 140 is differentiated to provide a sharp trigger pulse for a gating univibrator 142. The time delay of the gating univibrator 142 is adjusted to give a gate width of sufficient duration to permit proper operation of the memory circuit 44. Gating pulses of opposite polarity are available from the anode circuits of the tubes comprising the univibrator 142.

Figure 6:
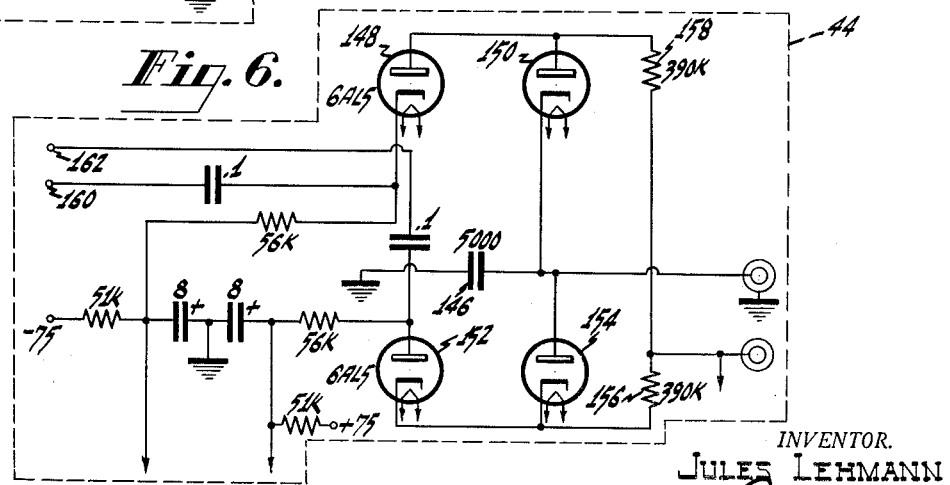

The opposite polarity pulses from the gating univibrator 142 are applied to the memory circuit 44 illustrated schematically in Figure 6. The voltage to be sampled which is the output signal from the receiver 10, is applied to the memory circuit input terminal 144. The resultant information appearing at the input terminal 144 is stored in a memory capacitor 146 when the memory circuit is triggered by a gating pulse from the gating univibrator 142. The memory circuit includes four diodes 148, 150, 152 and 154. In the quiescent state, two bias voltages, one a negative voltage applied to the cathode of the diode 148 and the other a positive voltage applied to the anode of the diode 152 cause these diodes to conduct. The current through the diodes 148 and 152 cause a voltage to be developed across the resistors 156 and 158 which is of a polarity to maintain the diodes 150 and 154 non-conducting. When positive and negative pulses are applied respectively to the terminals 160 and 162 from the gating univibrator 142, the diodes 148 and 152 are cut-off, and the input voltage from the receiver 10 under alignment can charge the memory capacitor 146 through the diodes 150 and 154 depending upon the polarity of the input signal. For optimum operation, the contact potential of the diodes 150 and 154 should be equal. However, good results may be obtained in this respect by reducing the filament voltage of the diodes below the rated value. Under these condtions it is fairly simple to select diode tubes and to obtain output voltages equal to the input voltage to about plus or minus .01 volt. The charging time constant of the circuit including the memory capacitor 146 is longer than the gating interval so that several cycles are required to bring the capacitor up to full charge. This however, is of no disadvantage as the time constant of the servo loop is much greater than the time constant of the sampling circuit.

The voltage across the memory capacitor 146 is available at an output treminal 164 for application to the chopping circuit 52 which is shown in Figure 7.

The chopping circuit, as discussed briefly in the general system of Figure 1, is provided for the purpose of converting the gradually varying output voltage from the I.F. amplifier under alignment into a square wave of corresponding amplitude and sense which may be amplified in A.C. coupled amplifiers to control the driving motors 76, 78, 80 and 82. The chopping circuit 52 comprises a vibratory element or armature 166 which is polarized so as to be moved back and forth between the fixed contacts 168 and 170 due to the attraction and repulsion of the magnetic fields set up by an adjacent armature coil 172. The coil 172 is excited with a sinusoidal voltage from a standard frequency voltage source so that the armature 166 is moved back and forth at a rate corresponding to the frequency of the source. The fixed contact 168 is connected to the memory capacitor 146 by way of the output treminal 165 whereas the fixed contact terminal 170 is connected to a terminal for connection with a predetermined reference voltage. The armature 166 is electrically connected to the input circuits of the servo amplifiers 68.

Considering now the operation of the chopping circuit 52, as the armature 166 is moved back and forth between the contacts 168 and 170 under the influence of the armature coil 172 it is successively connected to the potentials at which these contacts are operated. Therefore, during periods when the contacts 168 and 170 are not at the same potential, a square wave of voltage is produced having a frequency corresponding to the frequency exciting the armature coil 172. As the receiver 10 is brought into alignment with the reference potentials, the potential existing on the terminal 168 approaches and becomes equal to that on the terminal 170 and therefore no variation in potential exists as the armature 166 moves back and forth between the contacts 168 and 170. Thus there is no output signal for amplification by the servo amplifier to drive the motor.

As also shown in Figure 7, the error signal applied to the A.C. servo amplifier 68 is amplified by a pentode amplifier 174 and coupled to a cathode follower stage 176. The signal coupling circuit between the cathode follower stage 176 and an amplifier stage 178 in the servo amplifier 68 includes a limit switch 180. In the normal operation of the system the limit switch completes the circuit between the cathode follower 176 and the input circuit for the amplifier stage 178. Each servo motor has an offset on the shaft that will operate the limit switches associated with the particular motor at either end of the normal tuning range of the tuning elements in the transformers 12, 14 and 16. At either limit the switch 180 is actuated to ground the output of the cathode follower stage 176 so that no error signal may be developed to drive the tuning motor 76. This provides a safe-guard to prevent damage to the tuning controls. The output signal from the tachometer generator is also coupled to the input circuit of the amplifier stage 178. The tachometer output signal is summed together with the amplified chopper signal. The amount of tachometer signal used in each loop varies and may be determined experimentally for best operation to provide fast and stable servo loops.

The amplifier stage 178 is coupled to a phase splitter 182 which drives a push-pull output amplifier stage 184. The anodes of the respective tubes in the push-pull output stage 184 are connected respectively to the field winding of the motor 76, to control the position of the motor armature in accordance with the error signal applied to the servo amplifier 68.

The variable gain amplifier 26 which is connected between the sweep frequency generator 24 and the receiver 10 is shown in detail in Figure 8. Signals from the sweep frequency generator 24 are applied to the amplifier input terminal 200. The amplifier comprises two pentode amplifiers 202 and 204 having pi type coupling networks 206 and 208 and a cathode follower output stage 210. The amplifier output terminal 212 is adapted to be connected to the input terminal 114 of the I.F. amplifier shown in Figure 2. The amplifier frequency response is relatively flat from 41 to 48 megacycles to pass the desired signals from the sweep frequency generator 24.

The gain of the amplifier 26 is controlled by the bias applied to the control grids of the two pentode amplifier stages 202 and 204. The bias control network includes a voltage divider including a variable resistor 214 and a resistor 216 connected between ground and the negative terminal of a D.C. power source not shown. The tap on the variable resistor 214 is connected through suitable networks to the control grids of the amplifiers 202 and 204.

As shown in Figure 1, the servo motor 76 controls the gain of the amplifier 26. To this end the variable resistor 214 tap is mechanically coupled to the servo motor for movement thereby. To increase the gain of the amplifier 26, the tap is moved toward the grounded end of the resistor so that a less negative voltage is applied to the control grids of the pentode amplifier stages 202 and 204. Conversely, the gain may be decreased by moving the tap in the opposite direction to apply a more negative voltage to the pentode amplifier stages 202 and 204.

The stabilized D.C. amplifier 51 shown in Figure 9 is used to amplify the output signal from the receiver 10. As shown in Figures 1 and 6 the amplified signal is applied to the video input terminal 144 of the gated memory circuits 44, 46, 48 and 50. Signals from the output terminal 116 (Figure 2) are applied to the amplifier input terminal 220. The amplifier has three stages 224, 226, and 228, the stage 228 being a cathode follower output stage. A feedback circuit 230 from the cathode of the stage 228 to the control grid of the stage 224 stabilizes the amplifier for gain, and includes a limiter 222 to avoid overload during some of the adjustments. An additional stabilizing element is provided to insure that the input and output voltages of the D.C. amplifier have their zero voltages simultaneously. This additional stabilizing network includes a vibrator 232 and an A.C. amplifier including the stages 234 and 236. For a further description of the D.C. amplifier reference may be made to "Stabilization of Wide Band D.C. Amplifiers For Zero and Gain," E. A. Goldberg, RCA Review, June 1950. The amplified output signal from the D.C. amplifier 51 is available at the output terminal 238.

In the operation of the automatic alignment system shown and described in connection with Figures 4 to 9, the apparatus to be aligned is first placed in an alignment fixture, the movable tap of the variable resistor 214 and the tuning elements of the three transformers 12, 14 and 16 are mechanically coupled to the servo motors 84, 86, 88 and 90, respectively. In the first step of the aligning procedure, the three transformers are detuned mechanically by adjusting the tuning slugs to a limit by either providing a predetermined input signal through the system or by mechanically detuning prior to the insertion of the tuner into the alignment rack. In the second stage all of the servo loops are energized, and the servos will position the tuning adjustments to result in an alignment response curve shown in Figure 3 of the drawings. The alignment system of the present invention is capable of accurately positioning the three tuning slugs in about three seconds.

Specifically, the output signals from the receiver under alignment and the predetermined reference potentials at the terminals 62, 64 and 66 are applied to the input terminals of a different memory circuit in each of the four servo loops. As sweep frequency generator 24 approaches the frequency to which the tuner 28 is tuned (44.5 megacycles), a pulse is produced which keys the gate pulse generator 36. The gate pulse generator 36 in turn triggers the memory circuit 44 for a predetermined time period to receive information from the receiver under alignment. This information is stored as a charge on a memory capacitor provided in the memory circuit, and is applied to one of the fixed terminals of the chopping circuit 52. The reference potential representative of the desired output level of the receiver at 44.5 megacycles is applied to the other fixed contact terminals. When the output level of the receiver under alignment differs from the predetermined reference potential, the potential on the fixed contact terminals of the chopper 52 will be different. Accordingly, an error voltage will be developed by the chopping circuit 52 which is amplified in the servo amplifier 68 to drive the motor 76. The motor 76 drives the tap on the resistor 214 as shown in Figure 8 to adjust the amplification of the sweep signal applied to the receiver under alignment in the direction to maintain the amplitude of the output signal therefrom constant at the level of the reference potential applied to the terminal 62. The time constant of this servo loop is fast relative to the other servo loops to insure that the receiver output amplitude at 44.5 megacycles is constant.

As the sweep frequency generator cyclically continues over the frequency range and approaches the frequency to which the tuner 30 is tuned (41.6 megacycles) a pulse is produced which is applied to the gate pulse generator 38. In the meantime the gating pulse from the gate pulse generator 36 to the memory circuit 44 has expired so that information from the receivers no longer affects this circuit. The gate pulse generator 38 produces a gating pulse to condition the memory circuit 46 to receive information from the receiver under alignment in response to the 41.6 megacycle input signal. Any difference in the response of the receiver 10 from the reference potential applied to the terminal 64 is utilized to produce an error signal by means of the chopping circuit 54, which error signal is amplified by the servo amplifier 70 to drive the servo motor 78. This adjusts the tuning of the transformer 12 in a direction to bring the low frequency response to the receiver under alignment to the level established by the reference potential applied to the terminal 64.

In like manner the tuner 32 when energized by a sweep frequency generator signal of 45.75 megacycles controls the third servo loop to tune the transformer 14 and correct the relative high frequency response of the receiver.

In the fourth servo loop the tuner 34 triggers the gate pulse generator 42 to cause the memory 50 to accept information from the receiver 10 in response to a 43.25 megacycle input. The chopper 60 however compares the response of the receiver at 43.25 megacycles available at the gated memory 50, with the response at 44.5 megacycles available at the gated memory 44. As can be seen from Figure 3, the response of the receiver 10 at these two frequencies should be substantially equal, hence the tilt of the curve may be controlled. The principle of comparing one portion of a particular frequency response curve with another may be extended to situations where the relative response at the different frequencies is not the same through the use of a ratio switch or the like. As the receiver 10 is brought into alignment, the output signals change in amplitude.

Since the gain of the receiver under alignment varies considerably during the alignment procedure, the input signal amplitude to the receiver 10 is varied by the variable gain amplifier 26 to fix the response of the receiver 10 at 44.5 megacycles to the value of the voltage applied to the terminal 62. The other fixed reference potentials are all predetermined ratios of that applied to the terminal 62 so that once the relative output of the receiver is fixed, the desired ratio of output amplitudes at the different frequencies may be readily achieved.

The automatic alignment system of this invention quickly and accurately operates to align tuned circuits such as stagger-tuned amplifiers to a predetermined frequency response characteristic by comparing the response of the receiver under alignment with relatively fixed standard reference potentials. Instability of the alignment apparatus is overcome by adjusting the gain of a signal channel including the amplifier to maintain a fixed output level at a frequency within the passband of the amplifier.

What is claimed is:

1. An automatic alignment system for aligning a tunable receiver circuit to a predetermined frequency response characteristic comprising means for providing a sweep frequency signal of different predetermined frequencies, tuning means for varying the tuning of said circuit, means providing reference potentials representative of the desired response of said tunable receiver circuit at said different predetermined frequencies, memory circuit means for storing signals respectively representative of the output of said receiver circuit at said different predetermined frequencies, means comparing the respective signals stored in said memory circuit means with said reference potentials to derive corresponding error signals, means including a variable gain amplifier responsive to at least one of said error signals for adjusting the composite gain of said system, and automatic means for simultaneously adjusting the response of said circuit at said different frequencies by tuning said tunable circuit in response to another of said error signals.

2. An automatic alignment system for aligning a tunable receiver circuit to a predetermined response characteristic in a desired frequency passband comprising, means for sequentially energizing said receiver circuit at different signal frequencies in said passband, tuning means for varying the tuning of said circuit, means providing reference potentials representative of the desired response of said tunable circuit at said different signal frequencies in said passband, means comparing the response of said circuit at said different frequencies with the corresponding reference potentials to derive error signals, a servo motor coupled to said tunable circuit, control circuit means connected to said motor for driving said motor to adjust the tuning of said tunable circuit, means comprising a servo loop and a variable gain amplifier responsive to at least one of said error signals for adjusting the composite gain of said system to maintain the amplitude of the output signal from said tunable circuit substantially constant at the signal frequency corresponding to said one error signal, and means comprising another servo loop responsive to at least one of said error signals for controlling said tuning means.

3. An automatic alignment system for aligning a stagger-tuned amplifier having a plurality of tunable circuits, comprising a signal channel including said stagger-tuned amplifier, means for sequentially energizing said amplifier at different signal frequencies in the desired amplifier passband, gain control means including a variable gain amplifier for adjusting the gain of said signal channel, tuning means for individually varying the tuning of each of said tunable circuits, means providing a plurality of reference potentials each representative of the desired response of said amplifier at a different one of said predetermined signal frequencies, means including a memory circuit for storing a first signal representative of the response of said amplifier at a first of said different predetermined signal frequencies, means comparing said first stored signal with the reference potential corresponding to the desired response of said amplifier at said first signal frequency to derive a first error signal, control means for automatically adjusting said gain control means in response to said first error signal to adjust the composite gain of said signal channel to maintain a substantially constant amplitude signal output from said channel at the frequency from which said last named error signal is derived, means including a second memory circuit for storing a second signal representative of the response of said amplifier at a second of said different predetermined signal frequencies, means comparing said second stored signal with the reference potential corresponding to the desired response of said amplifier at said second signal frequency to derive a second error signal, control circuit means responsive to said second error signal for automatically adjusting the tuning means of one of said tunable circuits, means comparing said first and second stored signals representative respectively of the response of said amplifier at said first and said second signal frequencies to derive a third error signal, and control circuit means for automatically adjusting the tuning means of another of said tunable circuits in response to said third error signal, said automatic adjustments of said tunable circuits being simultaneous.

4. An automatic alignment system for aligning a stagger-tuned amplifier having a plurality of tunable circuits to a predetermined frequency response characteristic over a desired frequency passband comprising a sweep frequency generator operable to produce a signal cyclically varying in frequency over at least a portion of said passband, a variable gain amplifier connected to said sweep generator for amplifying said signal cyclically varying in frequency, means applying the signal output from said variable gain amplifier to said tuned amplifier, a plurality of servo circuits, each of said servo circuits including a chopping circuit for comparing the response of said tuned amplifier at predetermined frequencies with reference potentials corresponding to the desired response of said tuned amplifier at each of said predetermined frequencies, one of said servo circuits connected to adjust the gain of said variable gain amplifier and the remaining ones of said servo circuits connected to adjust the tuning of different ones of said tunable circuits simultaneously, each of said servo circuits including a gated memory circuit connected to said chopping circuit, said memory circuits having normally blocked input circuits connected respectively with said tuned amplifier, each servo loop including gating means connected to unblock said memory circuits to store signal information representative of the response of said amplifiers to signals from said sweep frequency generator, the gating means in said servo loops each being responsive to a different frequency from said sweep frequency generator to unblock the memory circuit connected therewith.

5. In an automatic alignment system for aligning a stagger-tuned amplifier to a predetermined response characteristic over a desired frequency passband, said amplifier having a plurality of tunable circuits each including adjustable tuning means for varying the tuning of said circuit, comprising a plurality of servo circuits connected to adjust the tuning means of different ones of said tunable circuits, a variable gain amplifier connected in cascade with the signal input circuit of said stagger-tuned amplifier, a servo circuit connected to adjust the gain of said variable gain amplifier, means for providing a sweep frequency signal of different predetermined frequencies, means providing reference potential representative of the desired response of said amplifier to different signal frequencies in the passband thereof, means providing an error detecting circuit including memory circuit means for storing signals respectively representative of the signal output of said amplifier at said different signal frequencies and comparison means for comparing each of said stored signals with a reference potential corresponding to the desired signal output at the comparison frequency to derive error signals, said plurality of servo circuits responsive to certain of said error signals to adjust the different tuning means simultaneously so as to reduce said error signals, and said servo circuit connected to adjust the gain of said variable gain amplifier responsive to at least one of said error signals to maintain a substantially constant amplitude of the signal output from said stagger-tuned amplifier at one of said different signal frequencies.

6. An automatic alignment system for aligning a plurality of tunable receiver circuits connected in cascade relation to a predetermined frequency response characteristic comprising, a signal channel including said plurality of tunable receiver circuits, means for sequentially energizing said signal channel at different predetermined signal frequencies in the frequency range to be passed by said circuits, tuning means for individually varying the tuning of each of said tunable circuits, gain control means including a variable gain amplifier for adjusting the composite gain of said signal channel, means providing reference signals representative of the desired response of said tunable circuits at said different predetermined frequencies, means including memory circuits for storing signals respectively representative of the response of said cascade tunable circuits at each of said different predetermined frequencies, means comparing each of said stored signals with the corresponding reference signal for said frequencies to derive error signals, a first control means for automatically adjusting the gain of said signal channel in response to one of said error signals to maintain a substantially constant amplitude output signal from said signal channel at one of said different frequencies, and a second control means responsive to said error signals for automatically adjusting said tuning means by simultaneously varying the tuning of each of said tunable circuits.

7. An automatic alignment system for aligning a stagger-tuned amplifier having a plurality of tunable circuits, comprising a signal channel including said stagger-tuned amplifier, means for sequentially energizing said amplifier at different signal frequencies in the desired amplifier passband, gain control means including a variable gain amplifier for adjusting the composite gain of said signal channel, tuning means for individually varying the tuning of each of said tunable circuits, means providing a plurality of reference potentials each representative of the desired response of said amplifier at said different predetermined signal frequencies, means comparing the response of said amplifier at a first of said different predetermined signal frequencies with the reference potential corresponding to the desired response of said amplifier at said first signal frequency to derive a first error signal, control means responsive to said first error signal for automatically adjusting the tuning means of one of said tunable circuits, means comparing the response of said amplifier at a second of said different predetermined signal frequencies with the reference potential corresponding to the desired response of said amplifier at said second signal frequency to derive a second error signal, control circuit means for automatically adjusting another of said tuning means in response to said second error signal, means comparing the response of said amplifier at a third of said different predetermined signal frequencies with the reference potential corresponding to the desired response of said amplifier at said third signal frequency to derive a third error signal, and control circuit means for automatically adjusting said gain control means in response to said third error signal said automatic adjustments being simultaneous.

8. In an automatic alignment system for aligning a stagger-tuned amplifier to a predetermined response characteristic over a desired frequency passband, said amplifier having a plurality of tunable circuits each including adjustable tuning means for varying the tuning of said circuit, comprising a signal channel including said stagger-tuned amplifier, means for providing a sweep frequency signal of different predetermined frequencies, gain control means including a variable gain amplifier for adjusting the composite gain of said signal channel, a plurality of servo circuits each connected to simultaneously adjust the tuning of one of said tunable circuits, a servo circuit connected with said gain control means to adjust the gain of said signal channel, means providing reference potentials representative of the desired response of said amplifier to different signal frequencies in the passband thereof, means including a plurality of memory circuits for storing signals respectively representative of the response of said amplifier at said different signal frequencies in said passband, means for deriving a plurality of error signals corresponding to the amount of mistuning of said amplifier at different signal frequencies in said passband comprising an error detecting circuit for comparing each of the signals stored in said memory circuits with a reference potential corresponding to the desired signal output at the comparison frequency, means for applying said error signals to said plurality of servo circuits to automatically adjust the tuning means connected therewith, and means for applying at least one of said error signals to said servo circuit connected with said gain control means to automatically adjust the gain of said signal channel to maintain a substantially constant amplitude output signal from said signal channel at the signal frequency from which said last named error signal is derived.

9. An automatic alignment system for aligning a plurality of tunable receiver circuits connected in cascade relation to a predetermined frequency response characteristic comprising a signal channel including said plurality of tunable receiver circuits, means for a sequentially energizing said signal channel at different predetermined signal frequencies in the frequency range to be passed by said circuits, tuning means for individually and simultaneously varying the tuning of each of said tunable circuits, automatic gain control means including a variable gain amplifier for adjusting the composite gain of said signal channel to maintain the output level therefrom constant at a predetermined frequency within said frequency range, means providing reference signals related in a predetermined manner to said constant output level and representative of the desired response of said tunable circuits at different predetermined frequencies, means including memory circuits for storing signals respectively representative of the response of said cascade tunable circuits at each of said different predetermined frequencies, means comparing each of the signals stored in said memory circuits with the corresponding reference signal for said frequencies to derive error signals, and automatic control means responsive to said error signals for simultaneously adjusting said tuning means.

References Cited in the file of this patent

UNITED STATES PATENTS

| | | |
|---|---|---|
| 2,251,064 | Martin et al. | July 29, 1941 |
| 2,376,667 | Cunningham et al. | May 22, 1945 |
| 2,465,531 | Green | Mar. 29, 1949 |
| 2,634,373 | Shostak | Apr. 7, 1953 |
| 2,719,270 | Ketchledge | Sept. 27, 1955 |
| 2,727,994 | Enslein | Dec. 20, 1955 |
| 2,753,526 | Ketchledge | July 3, 1956 |
| 2,843,747 | Ashley | July 15, 1958 |